A. ROGERS.
BEEHIVE.
APPLICATION FILED JULY 5, 1910.
993,551.
Patented May 30, 1911.
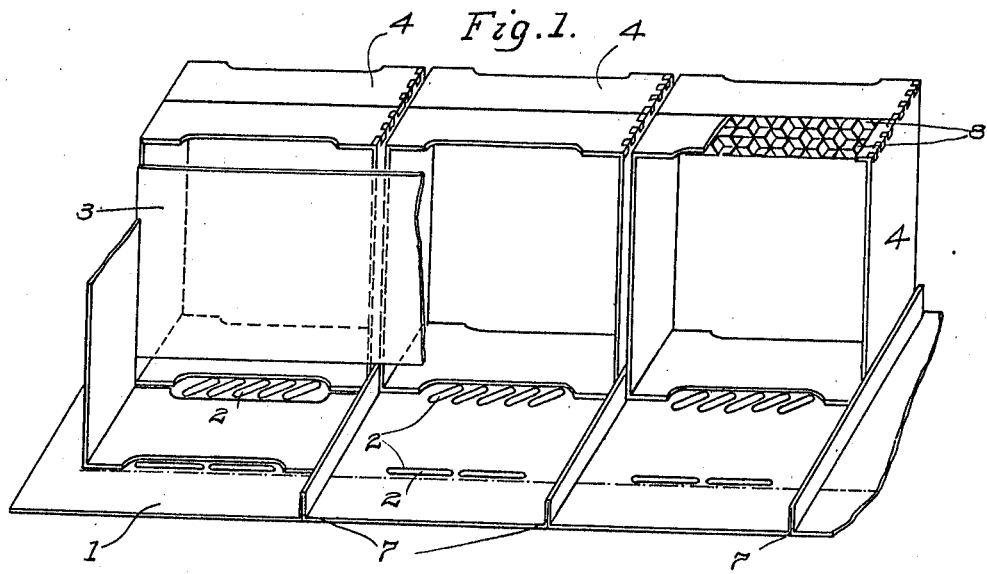
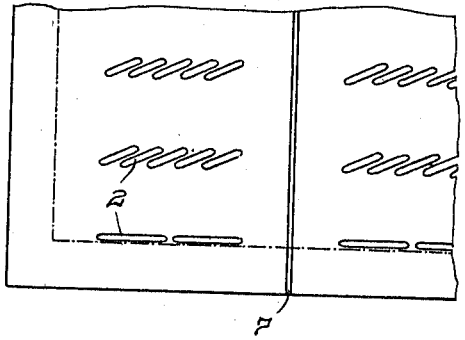
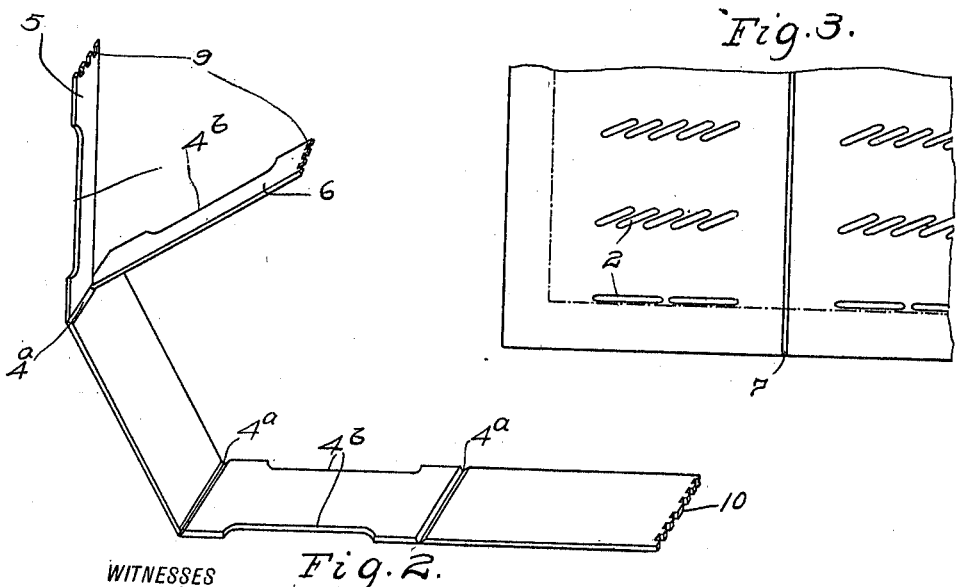
WITNESSES
INVENTOR
Albert Rogers
BY
A. B. Bowman
ATTORNEY

UNITED STATES PATENT OFFICE.

ALBERT ROGERS, OF CORONADO, CALIFORNIA.

BEEHIVE.

993,551.	Specification of Letters Patent.	Patented May 30, 1911.

Application filed July 5, 1910. Serial No. 570,322.

*To all whom it may concern:*

Be it known that I, ALBERT ROGERS, a citizen of the United States, residing at Coronado, county of San Diego, and State of California, have invented certain new and useful Improvements in Beehives, of which the following is a specification.

My invention relates to bee-hives and more particularly to those divided into upper and lower compartments and the objects are to provide a special partition for dividing a bee-hive into upper and lower compartments and so constructed as to permit the working bees to pass into the upper compartments, but preventing any excepting the working bees from doing so; to provide vertical partitions between the honey comb boxes, to prevent the said boxes from being cered together by the working bees and to provide honey comb boxes of such construction that will facilitate their proper placing in the bee-hive.

The uses and advantages of my invention will readily be apparent from the following description, reference being had to the accompanying drawings, in which,—

Figure 1 is a perspective view of the upper compartment of a bee-hive, showing my improved partitions and a plurality of honey comb boxes, Fig. 2 is a perspective view of my specially constructed honey comb box, disassembled, Fig. 3 is a top view of a portion of the horizontal partition showing the openings for the passage of the working bees.

Similar characters of reference refer to similar parts throughout the several views.

My invention consists of a horizontal partition 1, for dividing the bee-hive into upper and lower compartments, vertical partition 3, to be placed between the honey comb boxes in the upper compartments, and honey comb boxes 4. The horizontal partition 1 is provided with openings of such size that the working bees can pass through, but are not large enough to permit other bees to do so and it is provided with a plurality of upward extending projections 7, spaced a sufficient distance apart, to allow the honey comb boxes 4, to be placed between them, and between the sides of the honey comb boxes 4, are provided vertical partitions 3 to prevent the bees from cering the boxes 4 to each other. The honey comb box is made of a single piece provided with three grooves, cut across at the folding places $4^a$ and make four sections. Two of these sections have their sides cut away at $4^b$ to allow the passage of the bees and to facilitate handling. The upper section is also divided into two parts 5 and 6 by means of a longitudinal slot sawed therein on an angle of forty-five degrees, adapted for attaching the foundation comb, and the ends provided with tenons 9 adapted to fit the mortises 10 provided in the opposite end.

It will be readily seen that by this method of construction the queen bee or other than the working bees cannot pass from the lower compartment of the bee-hive into the compartment above the horizontal partition 1, while the working bees have free access thereto through the openings 2, and by means of the vertical partition 3 and the projections 7, the honey comb boxes are kept separate and apart from each other, and they are so constructed that they are the most readily placed in a certain position.

Having thus described my invention, what I claim as new and desire to secure by Letters Patent is,—

1. In a bee-hive, the combination of a lower compartment, an upper compartment, a horizontal metallic partition between said compartments, a plurality of projections formed on said partition across the upper surface thereof to prevent the honey comb boxes from being cered together, honey comb boxes between said projections, slots in said partition adapted to permit the free passage of working bees, and to prevent the passage of other bees, and vertical partitions between the honey comb boxes to prevent them from being cered together, all substantially as set forth.

2. In a bee-hive, the combination of upper and lower compartments, a metallic partition provided with projections spaced apart and formed out of the metal of said partition, honey comb boxes between said projections, slots in said partition, immediately beneath the cut away portion of the honey comb boxes, adapted to permit the free passage of working bees, but to prevent the passage of other bees, and vertical partitions placed transversely above said projections and between the honey comb boxes, all substantially as set forth.

In testimony whereof, I have hereunto subscribed my name in the presence of two subscribing witnesses.

ALBERT ROGERS.

Witnesses:
 GEORGE F. COOMBES,
 ABRAM B. BOWMAN.